US006061682A

United States Patent [19]
Agrawal et al.

[11] Patent Number: 6,061,682
[45] Date of Patent: May 9, 2000

[54] METHOD AND APPARATUS FOR MINING ASSOCIATION RULES HAVING ITEM CONSTRAINTS

[75] Inventors: Rakesh Agrawal; Ramakrishnan Srikant; Quoc Vu, all of San Jose, Calif.

[73] Assignee: International Business Machine Corporation, Armonk, N.Y.

[21] Appl. No.: 08/910,194

[22] Filed: Aug. 12, 1997

[51] Int. Cl.[7] .................................................. G06F 17/30
[52] U.S. Cl. ...................... 707/6; 707/1; 707/7; 707/10
[58] Field of Search ................................. 707/1, 6, 7, 10

[56] References Cited

U.S. PATENT DOCUMENTS

| | | | |
|---|---|---|---|
| 5,418,948 | 5/1995 | Turtle ........................................... | 707/4 |
| 5,644,686 | 7/1997 | Hekmatpour ............................... | 706/45 |
| 5,724,573 | 3/1998 | Agrawal et al. ............................ | 707/6 |
| 5,727,199 | 3/1998 | Chen et al. ................................. | 707/6 |
| 5,742,811 | 4/1998 | Agrawal et al. ............................ | 707/6 |
| 5,794,209 | 8/1998 | Agrawal et al. ............................ | 705/10 |
| 5,819,266 | 10/1998 | Agrawal et al. ............................ | 707/6 |

OTHER PUBLICATIONS

Toivonen, "Sampling Large Databases for Association Rules," (Univ. of Helsinki) *Proc. of the 22nd VLDB Conference*, 12 pgs., Mumbai (Bombay), India, 1996.

Agrawal et al., "Fast Discovery of Association Rules," *Advances in Knowledge Discovery and Data Mining*, AAAI/MIT Press,(18 pgs) 1996.

Agrawal et al., "Parallel Mining of Association Rules," *IEEE Transactions on Knowledge and Data Engineering*, vol. 8, No. 6, pp. 962–969, Dec. 1996.

Han et al., "Scalable Parallel Data Mining for Association Rules," Pub. No. ACM 0–89791–911–4/97/00005, *Proc. of the ACM SIGMOD Conf. on Management of Data*, (pp. 277–288) Tucson, AZ, May 1997.

Agrawal et al., "Fast Algorithms for Mining Association Rules in Large Databases," *Proc. of the VLDB Conference*, (pp. 487–499) Santiago, Chile, 1994.

Mannila et al., "Improved Method for Finding Association Riles," Pub. No. C–1993–65, 20 pages, Dept. of Computer Science, University of Helsinki, 1993.

*Primary Examiner*—Paul R. Lintz
*Assistant Examiner*—Jean Bolte Fleurantin
*Attorney, Agent, or Firm*—Gray Cary Ware Freidenrich

[57] ABSTRACT

A method for discovering association rules in a database that employs item constraints for extracting desired data relationships from a data base, thereby reducing the execution time of the rule discovery process and increasing the quality of the information returned. Such constraints allow users to specify the subset of rules in which the users are interested. Given a set of transactions D and constraints represented by a boolean expression $\beta$, the invention integrates the constraints into a selected rule discovery method rather than implementing the constraints as a post-processing step. The invention quickly discovers association rules that satisfy $\beta$ and have support and confidence levels greater than or equal to user-specified minimum support and minimum confidence levels, and may be implemented even when a taxonomy is present.

38 Claims, 8 Drawing Sheets

FIG. 2
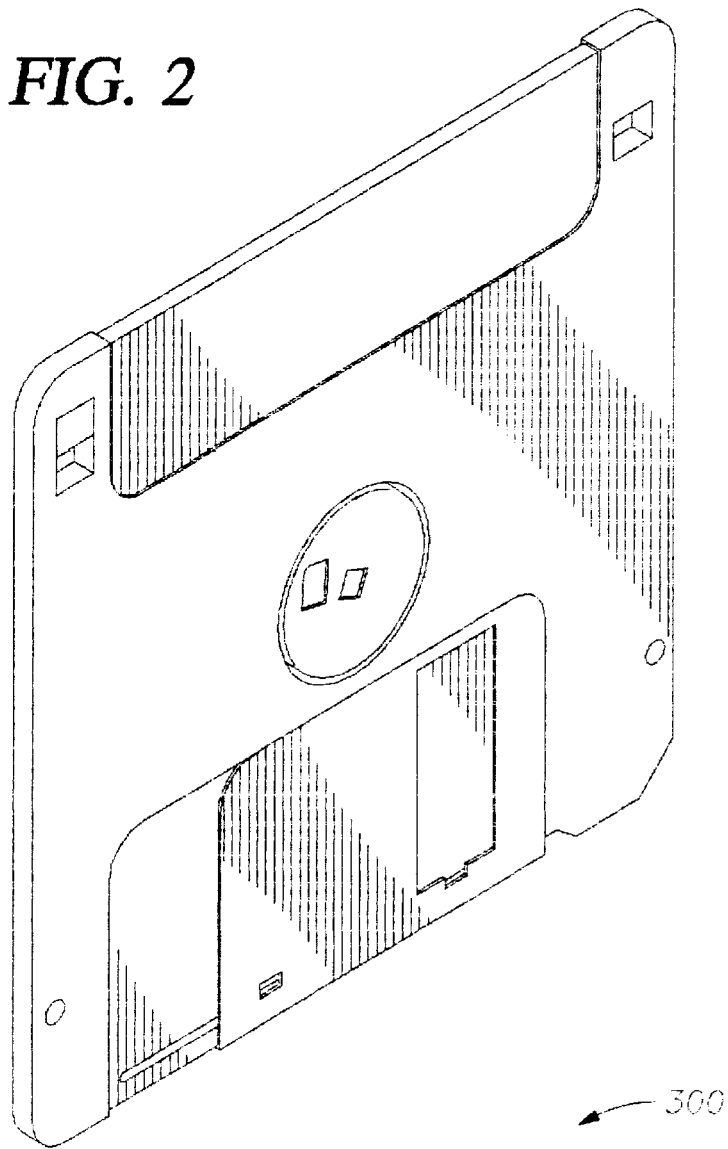
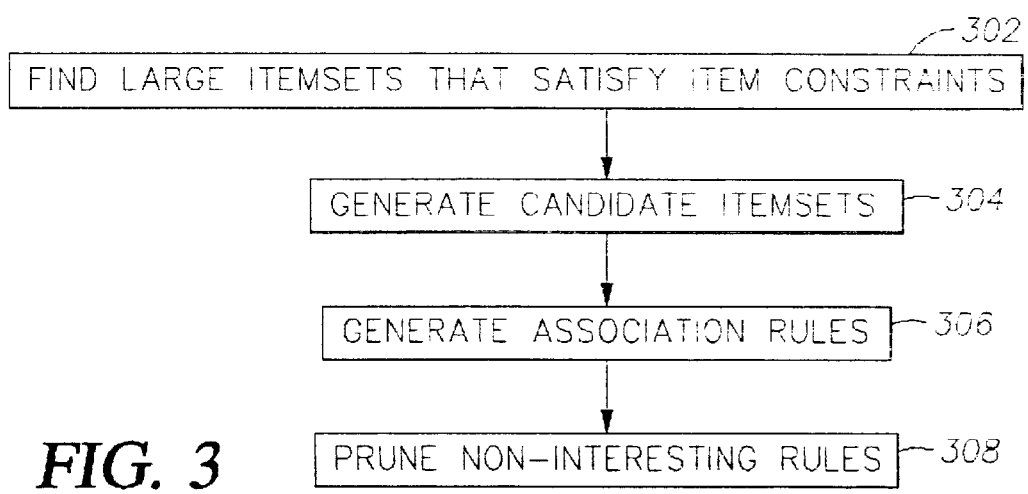
FIG. 3

METHOD AND APPARATUS FOR MINING ASSOCIATION RULES HAVING ITEM CONSTRAINTS

This application contains materials related to the following issued or co-pending U.S. patent applications, which are commonly assigned to this application and each of which is incorporated by reference herein:

U.S. Pat. No. 5,615,341, Agrawal et al., issued Mar. 25, 1997 for "SYSTEM AND METHOD FOR MINING GENERALIZED ASSOCIATION RULES IN DATABASE";

U.S. patent application Ser. No. 08/227,428, filed Apr. 14, 1994, for "SYSTEM AND METHOD FOR QUERY OPTIMIZATION USING QUANTILE VALUES OF A LARGE UNORDERED DPT SET";

U.S. patent application Ser. No. 08,398,620, filed Mar. 3, 1995, for "SYSTEM AND METHOD FOR MINING SEQUENTIAL PATTERNS IN A LARGE DATABASE"; and U.S. patent application Ser. No. 08/415,006, filed Mar. 31, 1995, for "SYSTEM AND METHOD FOR QUICKLY MINING ASSOCIATION RULES IN A DATABASE.

BACKGROUND OF THE INVENTION

1. Field of the Invention

The present invention relates generally to the analysis ("mining') of large computer databases and the discovery of generalized association rules between significant transactions recorded in such a database. More particularly, the invention concerns integrating constraints into a database rule discovery method during its execution rather than at a post-execution stage.

2. Description of the Related Art

Customer purchasing habits can provide invaluable marketing information for a wide variety of applications. If a retailer knows with some certainty that a consumer who purchases a first set of items, or "itemset", can be expected to purchase a particular second itemset along with the first itemset, the retailer can create more effective store displays and inventory controls. Simply, it would be helpful from a marketing standpoint to know the purchasing habits of the store's customers.

Advertisers may also benefit from a thorough knowledge of consumer purchasing tendencies. Typical business decisions such as what item to put on sale, how to design coupons, and how to place items on shelves to maximize profit are just a few of the benefits that can be realized. Further, catalogue companies can conduct more effective mass mailings if they know the tendencies of consumers to purchase particular sets of items with other sets of items. Database mining and association principles are useful in many other areas throughout business and science.

In the past, building large detailed databases that could chronicle thousands or millions of consumer transactions, much less deriving useful information from the databases (i.e., mining the databases), was highly impractical. Consequently, marketing and advertising strategies have been based upon anecdotal evidence of purchasing habits and thus have been susceptible to inefficiencies and inaccuracies in consumer targeting, that have been difficult if not impossible to overcome.

With the advent of modern technology, building large databases of consumer transactions is possible. By using a bar-code reader, a retailer can almost instantaneously read "basket data." Basket data tells the retailer, among other things, when a particular item from a particular lot was purchased by a consumer, or how many items the consumer purchased. This data is automatically stored in electronic storage. Further, when the purchase is made with a debit or credit card, the identity of the purchaser can be immediately determined, recorded, and stored along with the basket data. Still further, vastly improved data storage media have made it possible to electronically store huge amounts of such information for future use.

However, building a transaction database alone is of little use without a fast and efficient way of analyzing the database for useful information. Such database analysis becomes increasingly problematic as the size of a database expands into the gigabyte, or terabyte ranges, or beyond.

Traditionally, database analysis regimes have been classified many ways. For example, effective systems are known for quickly discovering association rules that indicate purchasing habits during single transactions. In such cases, the association rules may indicate, with user-defined degrees of confidence, which frequently-recurring itemsets are likely to purchased along with other frequently-recurring itemsets in a transaction. An itemset "frequently occurs" in a database and is referred to as being "large" if it appears in the database with at least a user-defined regularity, referred to herein as "minimum support".

Previous database discovery systems, however, do not consider discovering association rules across different levels of a taxonomy. Instead, the systems restrict the items in the discovered rules to leaf nodes in databases. Thus, for example, in the case of an itemset taxonomy in which the item "jacket" hierarchicly depends from the item "outerwear", which in turn hierarchicly depends from the item "clothes", the prior inventions might generate an association rule that indicates that people who purchase jackets tend to purchase hiking boots at the same time. However, prior inventions are unable to generate more generalized rules, e.g., that people who purchase outerwear or clothing tend to purchase hiking boots.

Unfortunately, when association rules are restricted to just the leaves of a taxonomy, many significant associations might escape detection. For example, few consumers might purchase hiking boots with jackets, but many people might purchase hiking boots with outerwear in general, without previous discovery systems so discovering. Consequently, by not considering associations across levels of taxonomies, previous systems are unable to prune out non-interesting and redundant rules.

In summary, the problem of discovering association rules has led to the development of the various methods discussed above. However, in practice, users are usually interested in a subset of association rules. For example, they may only want rules that contain subsets ("children") of a specific item ("parent") in a given hierarchy. While constraints for generating desired rules might be applied as a post-processing step, this late consideration of the constraints increase the time a method would spend reaching a desired subset of association rules. A new method is needed that allows user-specified constraints to be integrated into a rule discovery process itself so that the associated processing time is reduced.

SUMMARY OF THE INVENTION

Broadly, the present invention involves the development of a database analysis method to extract desired data relationships from a data base. More precisely, the invention concerns the integration of constraints into a rule discovery process—rather than at a post-processing stage—to reduce the execution time of the process and to increase the quality of the information returned.

Specifically, given a set of transactions recorded in a database and constraints represented by an expression β, the present invention employs the constraints to generate rules that satisfy β. The rules generated may also have support and confidence values greater than or equal to user-specified minimum support and confidence values. Furthermore, the present invention satisfies these requirements even when a taxonomy is present.

In one embodiment, the invention may be implemented to provide a method employing user implemented constraints to generate rules from a database. The constraints are executed during the rule discovery process rather than at a post-processing stage. Generally, the method begins by finding large itemsets in the database. A "large itemset" is a set of one or more items which appears in at least a user-defined number of all transactions in the database. After large itemsets have been identified, constraints may be placed on them. These constraints direct continued processing when generating candidate itemsets. Candidate itemsets are itemsets which are "interesting" to the user. The candidate sets are employed during the rule discovery process to quickly identify interesting data needed to generate user requested association rules which are of interest to the user.

For example, the present invention might be applied to a database which chronicles transactions in an automobile parts, supplies, and service center. The application might yield an association rule that 98% of all customers who purchase tires along with tire pressure gages also purchase wheel balancing services during the transaction. Alternatively, this relationship could be stated with a 98% confidence level that wheel balancing services are not purchased separately from tires and tire pressure gages. As recognized by the present invention, the implications of association rules which are discovered between itemsets can produce substantial economic value to retailers, advertisers, marketing, executives, and indeed in a wide variety of applications.

In another embodiment, the invention may be implemented as an apparatus. The apparatus may include a data processing device such as a mainframe computer using an operating system sold under trademarks such as MVS. The apparatus may also incorporate a database system and may access data stored on a remote data storage medium.

In still another embodiment, the invention may be implemented to provide a signal-bearing medium tangibly embodying a program of machine-readable instructions executable by a digital data processing apparatus to perform method steps for using an association rule generating method which employs item constraints. The signal-bearing media may comprise various types of storage, such as RAM, a magnetic data storage diskette, DADS storage, magnetic tape, electronic read-only memory, or other suitable signal-bearing media including transmission media such as digital, analog, and wireless communication links.

The invention affords its users with a number of distinct advantages. One advantage the invention provides is constraints implemented during the associating rule discovery process to more efficiently generate association rules. Another advantage provided is that by implementing the constraints, running times are reduced for such a process. The invention also provides a number of other advantages and benefits, which should be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein:

FIG. 2 is a perspective view of an exemplary signal-bearing medium in accordance with one embodiment of the present invention;

FIG. 3 is a flow chart depicting the general overall operation of the present invention;

DETAILED DESCRIPTION OF THE PREFERRED EMBODIMENTS

Figure 1:
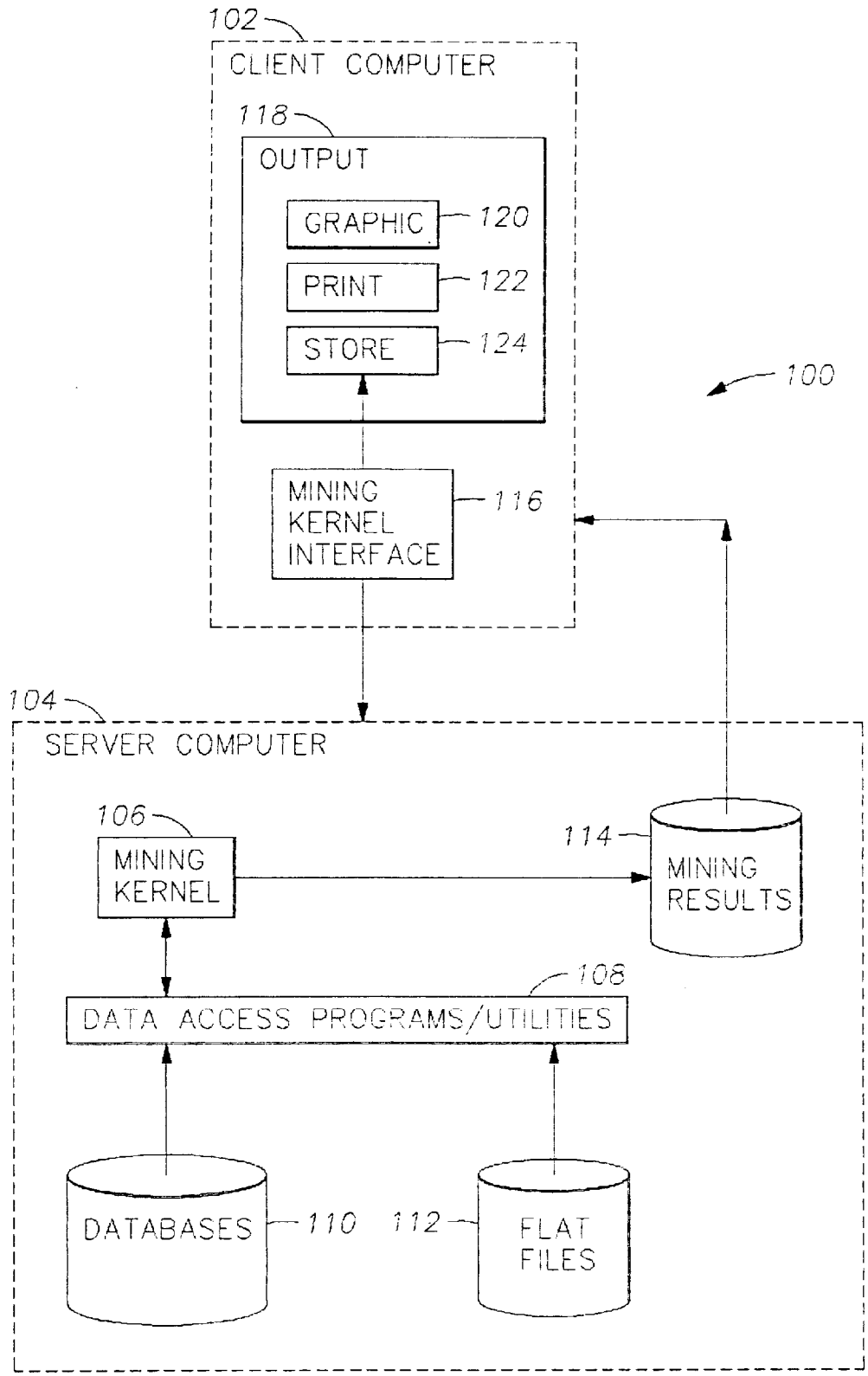
FIG. 1 is a block diagram of the hardware components and interconnections for discovering generalized association rules in accordance with one embodiment of the invention.

The present invention concerns discovering association rules in a database in the presence of constraints that may be expressed as boolean expressions over the presence or absence of items in the database. Such constraints allow users to specify the subset of rules in which the users are interested. The constraints are integrated into an association rule discovery method instead of in a post-processing step, thereby substantially reducing the time required to discover association rules.

The present invention includes various preferred methods for generating "candidate" itemsets and may be implemented in a broader sense as discussed in U.S. Pat. No. 5,615,341, Agrawal et al., for "SYSTEM AND METHOD FOR MINING GENERALIZED ASSOCIATION RULES IN DATABASES", incorporated by reference above. Furthermore, the present invention may be used in conjunction with other methods using candidate generation, such as disclosed in Toivonen, "Sampling Large Databases for Association Rules", *Proc. of the 22nd Int'l. Conf. on Very Large Databases (VLDB)*, Mumbai (Bombay), India, September 1996, and may be applied directly to the methods disclosed in Srikant et al., "Mining Generalized Association Rules", *Proc. of the 21st Int'l. Conf. on Very Large Databases (VLDB)*, Zurich, Switzerland, September 1995. Each of the above references are incorporated by reference herein.

To better understand the methods discussed below, a general statement of the relationships and nomenclature used in one embodiment of the invention follows. Because the invention's methods may also be practiced when a taxonomy is present, both taxonomy and non-taxonomy implementations are discussed.

In the present invention, $\mathcal{L}=\{l_1, l_2, \ldots, l_m\}$ defines a set of literals called items. G is a taxonomy directed acyclic graph (DAG) on the literals, and represents a set of taxonomies. A discussion regarding DAG taxonomies may be found in U.S. Pat. No. 5,615,341 referenced above. G may contain a parent "p" and a child "c" of p, and p may represent a generalization of c. G may also include an ancestor "x" and a descendant "y" of x if there is a directed path relationship from x to y in G.

D is a set of transactions, where each transaction T is a set of items such that $T \subseteq \mathcal{L}$. A transaction T supports an item $x \in \mathcal{L}$ if x is in T or x is an ancestor of some item in T. A transaction T supports an itemset $X \subseteq \mathcal{L}$ if supports every item in the set X.

A generalized association rule is an implication of the form $X \rightarrow Y$, where $X \in \mathcal{L}$, $Y \cap \ominus$. The rule $X \rightarrow Y$ holds in the transaction set D with confidence c of c % transactions in D that support X also support Y. The rule $X \rightarrow Y$ has support s in the transaction set D it s % of transactions in D support $X \cup Y$.

Let β be constraints represented as a boolean expression over $\mathcal{L}$. Without loss of generality, β may be in disjunctive normal form (DNF). That is, β is of the form $D_1 \vee D_2 \vee \ldots \vee D_m$, where each disjunct $D_i$ is of the form $\alpha_{i1} \wedge \alpha_{i2} \wedge \ldots \wedge \alpha_{in_i}$. When there are no taxonomies present, each element $\alpha_{ij}$ is either $l_{ij}$ or $\neg l_{ij}$ for some $l_{ij} \in \mathcal{L}$. When a taxonomy G is present $\alpha_{ij}$ can also be ancestor $(l_{ij})$, descendant $(l_{ij})$, ¬ ancestor $(l_{ij})$, or ¬ descendant $(l_{ij})$. There is no bound on the number of ancestors or descendants that can be included. To evaluate β, descendant $(l_{ij})$ is replaced by $l_{ij} \vee l'_{ij} \vee l''_{ij} \ldots$, and ¬descendant $(l_{ij})$ by $\neg(l_{ij} \vee l'_{ij} \vee l''_{ij} \vee \ldots)$, where $l'_{ij}, l''_{ij}, \ldots$ are the descendants of $l_{ij}$. A similar operation may be performed for an ancestor when practicing, the current invention.

Accordingly, given a set of transactions D, a set of taxonomies G and a boolean expression β, the invention's methods will discover association rules that satisfy β and have a support and a confidence level greater than or equal to a user-specified minimum support and minimum confidence level, respectively. Moreover, the following method and apparatus embodiments may be used to implement the invention.

Hardware Components & Interconnections

One aspect of the invention concerns an apparatus for extracting desired data relationships from a data base, which may be embodied by various hardware components and interconnections as described in FIG. 1.

Referring to FIG. 1, a data processing apparatus 100 four analyzing databases for generalized association rules is illustrated. In the architecture shown, the apparatus 100 includes one or more digital processing apparati, such as a client computer 102 and a server computer 104. In one embodiment, the server computer 104 may be a mainframe computer manufactured by the International Business Machines Corporation of Armonk, N.Y., and may use an operating system sold under trademarks such as MVS. Or, the server computer 104 may be a Unix computer, or OS/2 server, or Windows NT server, or IBM RS/6000 530 workstation with 128 MB of main memory running AIX 3.2.5. The server computer 104 may incorporate a database system, such as DB2 or ORACLE, or it may access data on files stored on a data storage medium such as disk, e.g., a 2 GB SCSI 3.5" drive, or tape. Other computers, servers, computer architectures, or database systems than those discussed may be employed. For example, the functions of the client computer 102 may be incorporated into the server computer 104, and vice versa.

FIG. 1 shows that, through appropriate data access programs and utilities 108, the mining kernel 106 accesses one or more databases 110 and/or flat files (i.e., text files) 112 which contain data chronicling transactions. After executing the steps described below, the mining kernel 106 outputs association rules it discovers to a mining results repository 114, which can be accessed by the client computer 102.

Additionally, FIG. 1 shows that the client computer 102 can include a mining kernel interface 116 which, like the mining kernel 106, may be implemented in suitable computer code. Among other things, the interface 116 functions as an input mechanism for establishing certain variables, including the minimum support value or minimum confidence value. Further, the client computer 102 preferably includes an output module 118 for outputting/displaying the mining results on a graphic display 120, print mechanism 122, or data storage medium 124.

Operation

In addition to the various hardware embodiments described above, a different aspect of the invention concerns a method to integrate constraints into an association rule discovery process to reduce the execution time of the process.

Signal-Bearing Media

Such a method may be implemented, for example, by operating the data processing apparatus 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to integrate constraints into an association rule discovery process rather than only applying post-processing pruning techniques.

This signal-bearing media may comprise, for example, RAM (not shown) contained within the client computer 102 or the server computer 104. Alternatively, the instructions may be contained in another signal-bearing media, such as a magnetic data storage diskette 200 shown in FIG. 2 and directly or indirectly accessible by the client computer 102 or server computer 104. Regardless of where they are contained, the instructions may be stored on a variety of machine-readable data storage media, such as DASD storage (e.g., a conventional "hard drive" or a RAID array), magnetic tape, electronic read-only memory (e.g., CD-ROM or WORM), an optical storage device (e.g., WORM), paper "punch" cards, or other suitable signal-bearing media including transmission media such as digital, analog, and wireless communication links. In an illustrative embodiment of the invention and not by way of limitation, the machine-readable instructions may comprise lines of compiled C language code.

Overall Sequence of Operation

FIG. 3 shows a sequence of method steps 300 to illustrate a general example of the method aspects of the present invention. For ease of explanation, but without any limitation intended thereby, the example of FIG. 3 is described in the context of the data processing apparatus 100 described above. The steps are initiated in step 302 when the apparatus 100 identifies large itemsets in the database 110 that satisfy defined item constraints. Thus, step 302 is essentially a large itemset generator. As more fully disclosed below, a "large itemset" is a set of one or more items which appears in at least a user-defined number of all transactions in the database 110, i.e., an itemset which appears in the database 110 in a user-defined "minimum support" percentage of transactions. Stated differently at step 302 the database 110 is accessed for determining a first number of times an itemset appears in the database and for designating the itemset as a large itemset when the first number of times exceeds a minimum support value. In contrast, "small" itemsets are itemsets that do not fulfill the minimum support criteria.

Moreover, items contained in the itemsets of transactions that are stored in the database 110 may be characterized by a hierarchical taxonomy. Thus, when defined by a taxonomy, some items are "ancestors" of other items. In other words the items are located at higher levels of the taxonomy than other "descendant" items which are located at a lower level but lie in a path from the ancestor item.

The large itemsets identified at step 302 satisfy, constraints ($\beta$) that may be placed on the large itemsets by the user. These constraints $\beta$ direct the continued analysis of the data and lead to the generation of candidate itemsets. For example, a constraint used by a clothes retailer might be that the retailer only wants to know relationships that contain both jackets and shoes, or contain clothes or any descendants of clothes and do not contain hiking boots or footwear. The constraints are implemented and candidate sets are generated in step 301 of the present invention to assist in quickly identifying the data needed to generate user requested association rules.

In accordance with the invention disclosed in detail below, step 306 is an association rule discoverer which accesses candidate itemsets for determining a second number of times at least one subset of a candidate itemset appears in the database 110. Then, the association rule discoverer at step 306 outputs an association rule which represents whether or not a predetermined or user specified minimum confidence value is satisfied.

For example, the association rule output might show customer buying habits, such as "30% of the people who buy jackets and shoes also buy socks at the same time, where jackets and shoes purchased with socks represents 2% of all clothing transactions logged." The association rule generator outputs generalized association rules and may be applied whether or not a taxonomy is present. If a taxonomy is present, the invention in one embodiment can span levels in the taxonomy. Further discussion pertaining to taxonomies and methods for association data mining may be found in Agrawal et al., "Fast Discovery of Association Rules", *Advances in Knowledge Discovery and Data Mining*, AAAI/MIT Press, 1996; Agrawal et al., "Parallel Mining of Association Rules", *IEEE Transactions on Knowledge and Data Engineering*, December 1996; Han et al., "Scalable Parallel Data Mining for Association Rules", *Proc. of the ACM SIGMOD Conf. on Management of Data*, Tucson, Ariz., May 1997; Srikant et al., "Mining Generalized Association Rules", *Proc. of the 21st Int'l. Conf. on Very Large Databases (VLDB)*, Zurich, Switzerland, September 1995; Savasere et al., "An Efficient Algorithm for Mining Association Rules in Large Databases", *Proc. of the 21st Int'l. Conf. on VLDB*, Zurich, Switzerland, September 1995; Toivonen, "Sampling Large Databases for Association Rules", *Proc. of the 22nd Int'l. Conf. on VLDB*, Mumbai (Bombay), India, September 1996, each of which is incorporated by reference herein.

In step 308, certain association rules discovered in step 306 might be pruned, on the basis that such rules might not be interesting. For example, if a taxomony is present and a rule has a close ancestor, and if the actual support and confidence of the rule fall within a user-defined expected boundary based upon that ancestor, the rule might not be interesting. As more fully described below, the expected support and confidence of a rule may be determined based upon the support and confidence of close ancestors, if any, of the rule. Pruning may take place either in step 308 or, as discussed below, may also be implemented after generating candidate itemsets.

Figure 4:
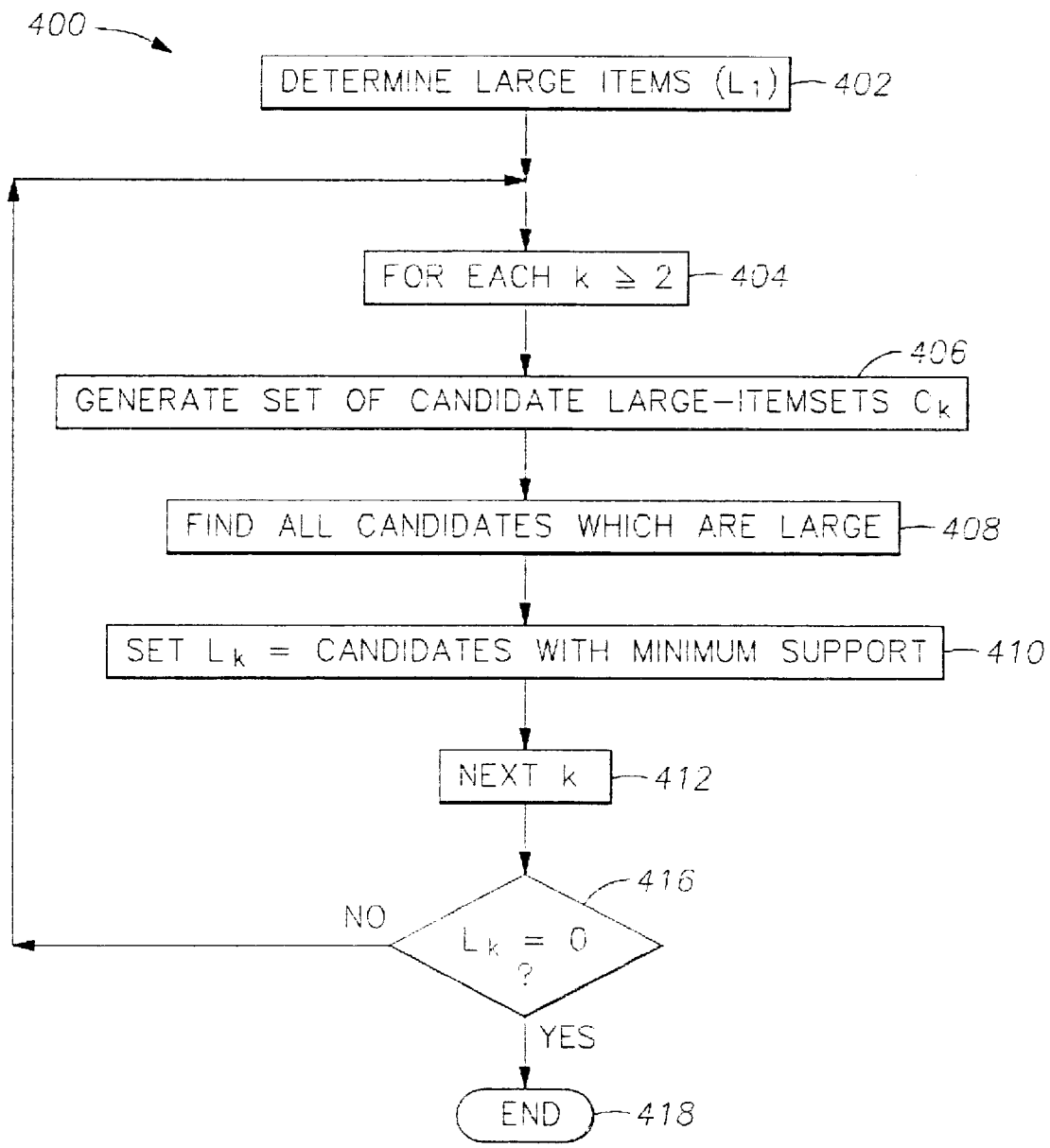
FIG. 4 is a flow chart depicting the basic operation for candidate generation in accordance with one embodiment of the present invention.

FIG. 4 shows one embodiment of a large itemset generator process illustrated in step 302 in FIG. 3. Recall that "large itemsets" means itemsets which appear in the database with a user-defined regularity (i.e., "frequency"), termed herein as "minimum support". For example, the user may want to know what itemsets appear in at least 25% of the customer transactions in the database. The minimum support value in this instance is 25%, and by counting the number of transactions in which the itemset appears and then dividing by the total number of transactions, it may be determined whether the itemset meets the minimum support criterion.

A method 400 for defining large itemsets is shown in FIG. 4, where, in step 402, the mining kernel 106 embodied by the data processing apparatus 100 identifies a set $L_1$ of large single-item itemsets in the database 110. To determine whether a single item itemset is large, all items in the database 110 are initially counted by passing over the database 110, and their support determined as described above. The following publications, all of which are incorporated herein by reference, disclose specific methods for finding large itemsets: Agrawal et al., "Mining Association Rules Between Sets of Items in Large Databases", *Proc. of the ACM SIGMOD Conf. on Management of Data*, Washington. D.C. 1993; Agrawal et al., "Fast Algorithms for Mining Association Rules in Large Databases", *Proc. of the VLDB Conf.*, Santiago, Chile 1994; Houtsma et al., "Set-Oriented Mining of Association Rules", *IBM Research Report RJ* 9567, October, 1993, and Mannila et al., "Efficient Algorithms for Discovering Association Rules", *KDD-94:AAAI Workshop on Knowledge Discovery in Databases*, July 1994.

Next, at step 404, the mining kernel 106 enters an iterative process for each $k \geq 2$. At step 406, a seed set of large itemsets $L_{k-1}$ having a length (i.e., number of itemsets) equal to "k−1" (initially consisting of the set of the large itemsets disclosed above, wherein k=2) is used for generating a set of candidate large itemsets $C_k$ having length k. Various methods for generating candidate sets are shown in FIGS. 5–9 and discussed below.

In step 408, the support for the candidate large itemsets is determined by passing over the database to count the number of times each candidate large itemset appears therein, and then determining whether the number of times equals the minimum support value defined by the user. If a taxonomy is present, the support for candidate large itemsets that are ancestors of transactions in the database is determined by implication by noting the support of its descendants.

In step 410, a forward set $L_k$ of actual large itemsets is set equal to the set of candidate large itemsets found in step 408 to have minimum support. This forward set $L_k$ of actual large itemsets becomes the seed for the next iteration in step 412. From step 412, the mining kernel 106 returns to step 404. When $L_k$ is empty, the process terminates in step 418. This decision is shown in step 416.

In further discussing the present intention the following definitions and relations are presented:

$\mathcal{L} = \{l_1, l_2, \ldots, l_m\}$ (a set of literals called items)

$\beta = D_1 \vee D_2 \vee \ldots \vee D_m$ ($m$ disjuncts)

$D_i = \alpha_{i1} \wedge \alpha_{i2} \wedge \ldots \wedge \alpha_{in_i}$ ($n_i$ conjuncts in $D_i$)

$\alpha_{ij} = l_{ij}$ or $\neg l_{ij}$, for some item $l_{ij} \in \mathcal{L}$ $S$     Set of items such that any itemset that satisfies $\beta$ contains an item from $S$ selected itemset    An item that contains an item in $S$ $k$-itemset    An itemset with $k$ items.

Figure 5:
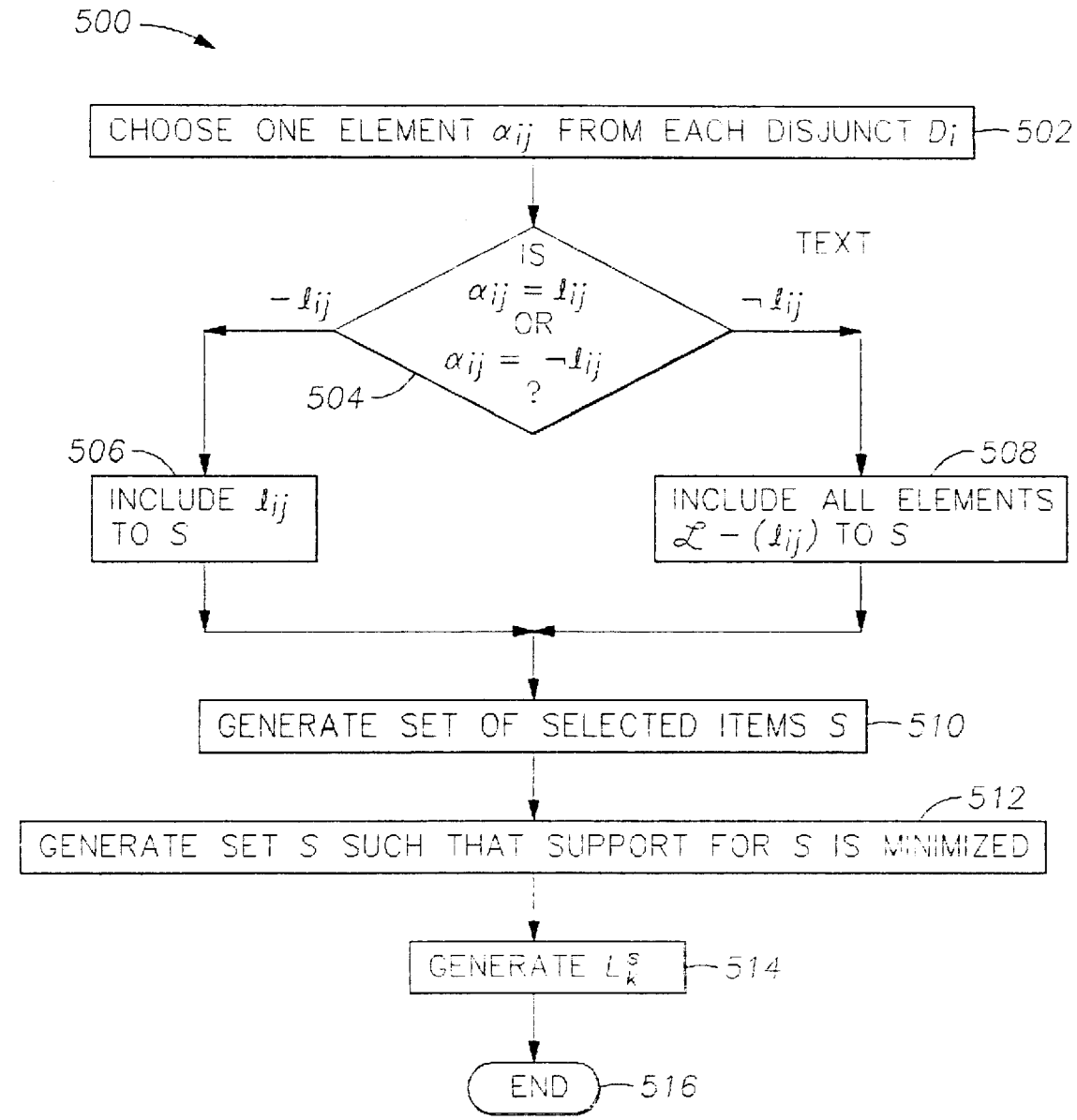
FIG. 5 is a flow chart showing the basic method for generating a set of selected items and large itemsets containing at least one of the selected items in accordance with one embodiment of the present invention.

$L_k^s$    Set of large $k$-itemsets (those with minimum support) that contain an item in $S$ $L_k^b$    Set of large $k$-itemsets (those with minimum support) that satisfy $\beta$ $C_k^s$    Set of candidate $k$-itemsets (potentially large itemsets) that contain an item in $S$ $C_k^b$    Set of candidate $k$-itemsets (potentially large itemsets) satisfy $\beta$ $F$    Set of all large items Continuing, FIG. 5 shows how a selected set of items S and selected large itemsets are generated. Selected large itemsets are used in some embodiments of the present invention for generating candidate itemsets as discussed below, and are itemsets that satisfy the user defined constraints $\beta$ and contain at least one item from S. For example, let a set of items $\mathcal{L}=\{1\ 2\ 3\ 4\ 5\}$. Consider $\beta=(1 \wedge 2) \vee 3$. The sets $\{1\ 3\}$, $\{2\ 3\}$ and $\{1\ 2\ 3\ 4\ 5\}$ all have the property that any (non-empty) itemset that satisfies $\beta$ will contain an item from this selected set. If $\beta=(1 \wedge 2) \vee \neg 3$, the selected set $S=\{1\ 2\ 4\ 5\}$ has this property. However, it should be noted that the inverse is not necessarily true: there are many itemsets that may contain an item from S but do not satisfy $\beta$.

For a given expression $\beta$, there may be many different sets S such that any itemset that satisfies $\beta$ contains an item from S. In the preferred embodiment, a set of items for S is selected so that the sum of the supports of items in S is minimized. Support of an item is calculated as discussed above. By minimizing the sum of the supports of items in S, execution time is reduced because the sum of the supports of the items correlates with the sum of the supports of the large itemsets that contain these items, which in turn correlates with the overall execution time for the data mining method. However, in another embodiment, a non-minimized set S is used to perform the method ever though execution time is not minimized.

In FIG. 5, generation of a set S begins in step 502 when the mining kernel 106 chooses one element $\alpha_{ij}$ from each disjunct $D_i$ in $\beta$. As shown in step 504, if $\alpha_{ij}=l_{ij}$, then $l_{ij}$ is added to S. If $\alpha_{ij}=\neg l_{ij}$, then all the elements in $\mathcal{L}-\{l_{ij}\}$ are added to S in step 508. An element $\alpha_{ij}=l_{ij}$ in $\beta$ is "present" in S if $l_{ij} \in S$ and an element $\alpha_{ij}=\neg l_{ij}$ is "present" if all the items in $\mathcal{L}-\{l_{ij}\}$ are in S. The mining kernel 106 generates a set of selected items in step 510.

For example, let X be an itemset that satisfies $\beta$. Since X satisfies $\beta$, there exists some $D_i \in \beta$ that is true for X. Furthermore, there exists some $\alpha_{ij} \in D_i$ such that either $\alpha_{ij}=l_{ij}$ and $l_{ij} \in S$ or $\alpha_{ij}=\neg l_{ij}$ and $(L-\{l_{ij}\}) \subseteq S$. If the former, $D_i$ is true for X, assuming $l_{ij} \in X$. If the latter, X must contain some item in $\mathcal{L}-\{l_{ij}\}$ since X does not contain $l_{ij}$ and X is not an empty set. Since $(\mathcal{L}-\{l_{ij}\}) \subseteq S$, X must contain an item from S.

In step 512 a set S having minimal support is generated by the mining kernel 106. In one embodiment the method requires $\Pi_{i=1}^m n_i$ time, where ni is the number of conjuncts in the disjunct Di. In the preferred embodiment, the method requires $\Sigma_{i=1}^m n_i$ time, and is optimal if no literal is present more than once in $\beta$. $S \cup \alpha_{ij}$ is defined as $S \cup l_{ij}$ if $\alpha_{ij}=l_{ij}$ and $S \cup (\mathcal{L}-\{l_{ij}\})$ if $\alpha_{ij}=\neg l_{ij}$. The preferred method is implemented as follows:

```
S := ∅
for i := 1 to m do begin // β = D₁ V D₂ V . . . VDₘ
    for j := 1 to nᵢ do // Dᵢ = αi₁ ∧ αᵢ₂ ∧ . . . ∧ αᵢₙ,
        Cost(αᵢⱼ) := support(S ∪ αᵢⱼ) − support(S);
    Let αᵢₚ be the αᵢⱼ with the minimum cost;
    S := S ∪ αᵢₚ;
end
```

For example, consider a constraint $\beta$ where the same literal is present in different disjuncts. For discussion, let $\beta=(1 \wedge 2) \vee (1 \wedge 3)$. Assume 1 has higher support than 2 or 3. Then the preferred method will generate a set $S=\{2\ 3\}$ whereas $S=\{1\}$ is optimal. Therefore, the following steps should be included in the preferred method: for each literal $l_{ij}$ that is present in different disjuncts, add $l_{ij}$ to S and remove any redundant elements from S. However, this operation should only be performed if it would decrease the support of S. If there are no overlapping duplicates—two duplicated literals in the same disjunct—an optimal set of items will result. If there are overlapping duplicates, e.g., $(1 \wedge 2) \vee (1 \wedge 3) \vee (3 \wedge 4)$, the method may choose either $\{1\ 4\}$ or $\{2\ 3\}$ as optimal. Implementing this technique in the preferred embodiment results in minimizing, the sum of the supports in S.

After a set S has been determined, a set of large itemsets $L_k^s$ is generated by the mining kernel 106. $L_k^s$ comprises the set of all large itemsets which contain an element of S. The method ends in step 516.

Figure 6:
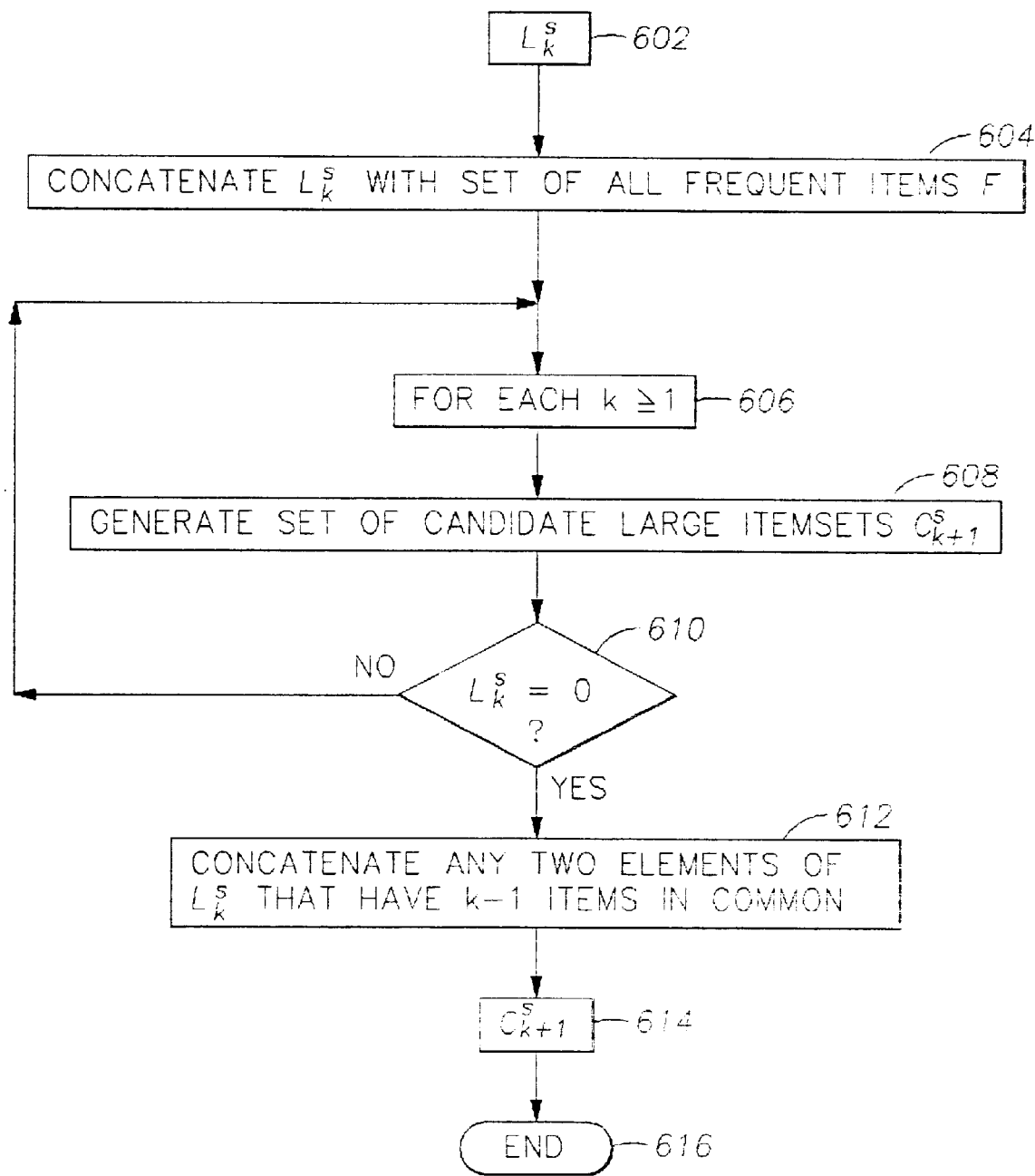
FIG. 6 is a flow chart showing the basic method for generating a set of candidate itemsets in accordance with one embodiment of the present invention.

FIG. 6 shows the details of one embodiment of the present invention where the mining kernel 106 enters an iterative process for creating potentially large candidate itemsets $C_k^s$ that, by definition, contain an item also found in set S. The method starts at step 602 with large itemset $L_k^s$, which was generated in step 514 of FIG. 5. $L_k^s$ is concatenated (i.e., joined) to the set of all large items F of database 10 in step 604 for $k \geq 1$ to create an initial $C_{k+1}^s$ having c itemsets in step 608. As before, k is the length, (i.e., number of itemsets) contained in C which also contains an item in S. More particularly, the itemsets C, designated as p.itemset₁, p.itemset₂ . . . p.itemset$_k$ of $L_k^s$ are joined to each of the large items F to yield a set $C_{k+1}^s$ of candidate large itemsets. For subsequent passes by the mining kernel 106 over the data if $L_k^s \neq 0$—this decision being shown in step 610—any two elements of $L_k^s$ that have k−1 items in common are concatenated in step 612. For any selected k-itemset where k>2, there will be at least two subsets with a selected item. However, each k+1-candidate may have up to k large selected k-subsets and k(k−1) pairs of large k-subsets with k−1 common items. After sufficient iterations by the mining kernel 106 so that $L_k^s=0$ (i.e., $L_k^s$ is empty), the candidate large itemsets are generated as designated by step 614. The method ends in step 616.

Figure 7A:
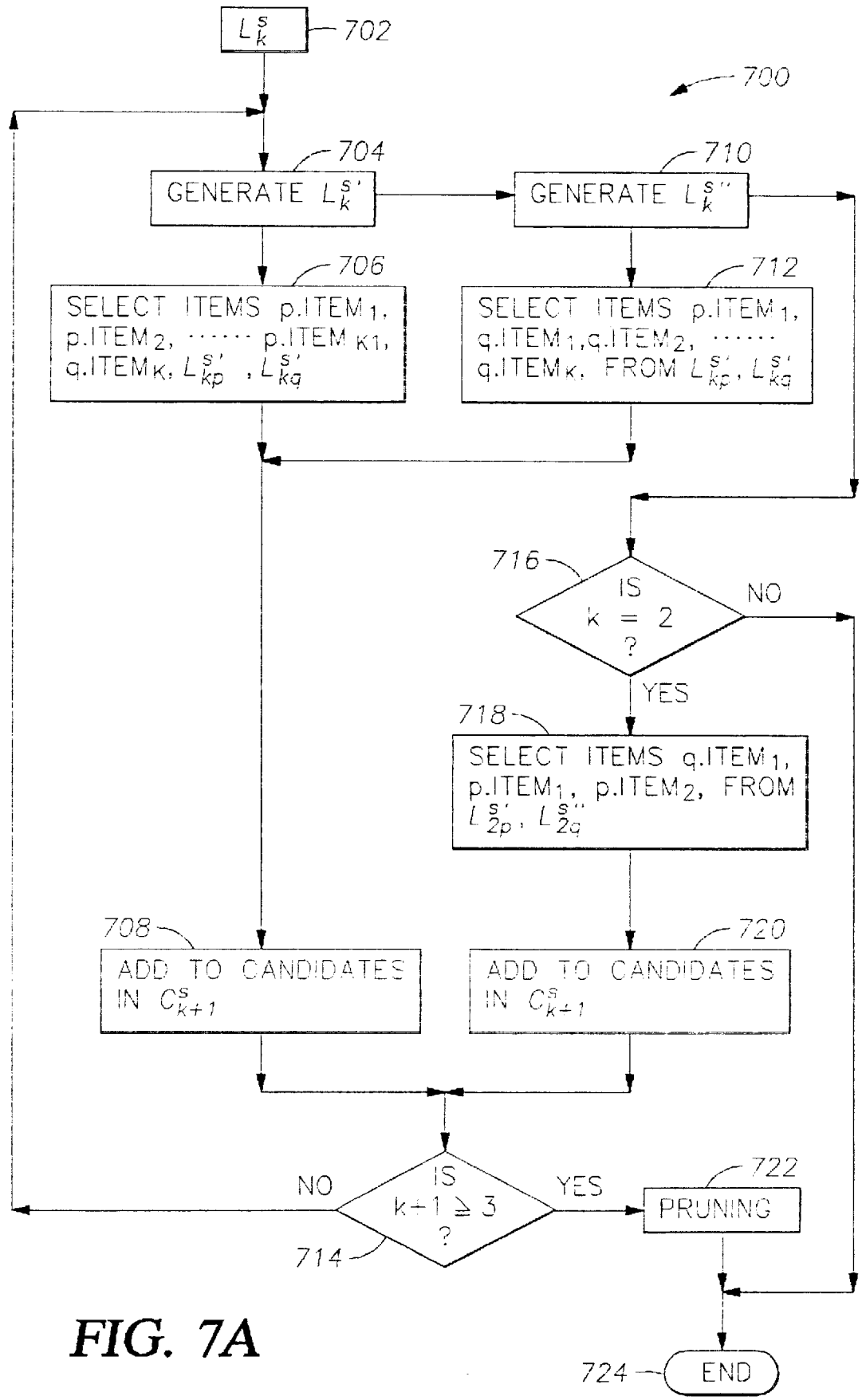
FIG. 7A is a flow chart showing a multiple-joins method for generating a set of candidate itemsets in accordance with another embodiment of the present invention.

FIG. 7A shows another embodiment of the present invention in creating potentially large candidate itemsets $C_k^s$ that contain an item also found in set S. For ease of understanding, the following represents the intuition behind this version of the method, where the itemset X corresponds to a candidate of the potentially large candidate sets $C_k^s$. The items in each of the following itemsets are lexicographically ordered as is common in the art, unless otherwise designated.

Let X be a large (k+1)-itemset, k≧2. If X has an item from set S in the first k−1 items, then there exist two large selected k-subsets of X with the same first k−1 items as X. If X has an item from set S in the last min(k−1, 2) items, then there exist two large selected k-subsets of X with the same last k−1 items as X, where "min" indicates that the support for the items is minimized. In other words, if X is a 3-itemset and the second item of the 3-itemset is an item from S, then there exists two large selected 2-subsets of X designated Y and Z—such that the last item of Y is the second item of X and the first item of Z is the second item of X.

To assist in understanding this relationship, another example is offered. Consider the large 4-itemset {1 2 3 4}. If either 1 or 2 is selected, {1 2 3} and {1 2 4} are two subsets with the same first 2 items. If either 3 or 4 is an S item, {2 3 4} and {1 3 4} are two subsets with the same last 2 items. For a large 3-itemset {1 2 3} where 2 is an item from S, {1 2} and {2 3} are the only two large selected subsets.

Returning, to FIG. 7A, the candidate generation method 700 starts in step 702 with $L_k^s$, the set of all selected large k-itemsets that contain an item from S. A subset $L_k^{s'}$ of $L_k^s$ is generated in step 704 such that $L_k^{s'}$ includes a subset p which is related to $L_k^s$ that one of the first k-items of p is in S. Items $p.item_1, p.item_2, \ldots p.item_k,$ and $q.item_k$ are selected from $L_k^{s'} p$ and $L_k^{s'} q$ in step 706 where ($p.item_1 = q.item_1, \ldots, p.item_{k-1}=q.item_{k-1},$ and $p.item_k<q.item_k$). The resultant is inserted into the set of potentially large itemset $C_{k+1}^s$ in step 708. Steps 702–708 may be implemented as follows:

```
//
L_k^s' := {p ∈ L_k^s | one of the first k-1 items of p is in S}
insert into C_{k+1}^S
select p.item_1, p.item_2, ..., p.item_k, q.item_k
form L_k^s' p, L_k^s' q
where (p.item_1 = q.item_1, ..., p.item_{k-1} = q.item_{k-1}; p.item_k < q.item_k)
```

In step 710, a subset $L_k^{s''}$ of $L_k^s$ is generated such that $L_k^{s''}$ includes a subset p which is related to $L_k^s$ such that one of the last min(k−1, 2) items of p is in S. Items $p.item_1, q.item_1, q.item_2, \ldots q.item_k$ are selected from $L_k^{s''} p$ and $L_k^{s''} q$ in step 712 where ($p.item_1<q.item_1, p.item_2=q.item_2, \ldots p.item_k=q.item_k$). The resultant is inserted into the set of potentially large itemsets $C_{k+1}^s$ in step 708. Steps 708–710 may be implemented as follows:

```
//
L_k^s" := {p ∈ L_k^s | one of the last min(k-1, 2) items of p is in S}
insert into C_{k+1}^S
select p.item_1, q.item_1, q.item_2, ... q.item_k
from L_2^s" p, L_k^s" q
where (p.item_1 < q.item_1, p.item_2 = q.item_2, ... p.item_k = q.item_k)
end
```

In step 714 if the number of itemsets contained in $C^s$ is greater than or equal to 3, all possible locations for a selected item in X have been considered for finding potential candidates. But when the number of itemsets contained in $C^s$ equals 2—that is, where the selected item in X is the second item—items $q.item_1, p.item_1, p.item_2$ are selected in step 716 from $L_2^{s'} p$ and $L_2^{s''} q$ where ($q.item_2=p.item_1$) and ($q.item_1, p.item_2$) are not selected. This results in the first and last items of candidates in step 718 not being selected, while the first item is selected for candidates resulting from step 706, and the last item from step 712 is selected for candidates resulting from step 706. This prevents the potential candidates from step 718 from overlapping with either the potential candidates of step 706 or the potential candidates of step 712. The potential candidates generated in step 718 are added to the $C_{k+1}^s$ in step 720. Steps 718–720 may be implemented as follows:

```
//
insert into C_{k+1}^s
select q.item_1, p.item_1, p.item_2
from L_2^s' p, L_2^s" q
where (q.item_2 = p.item_1) and (q.item_1, p.item_2 are not selected);
end
```

Figures 7B, 8:
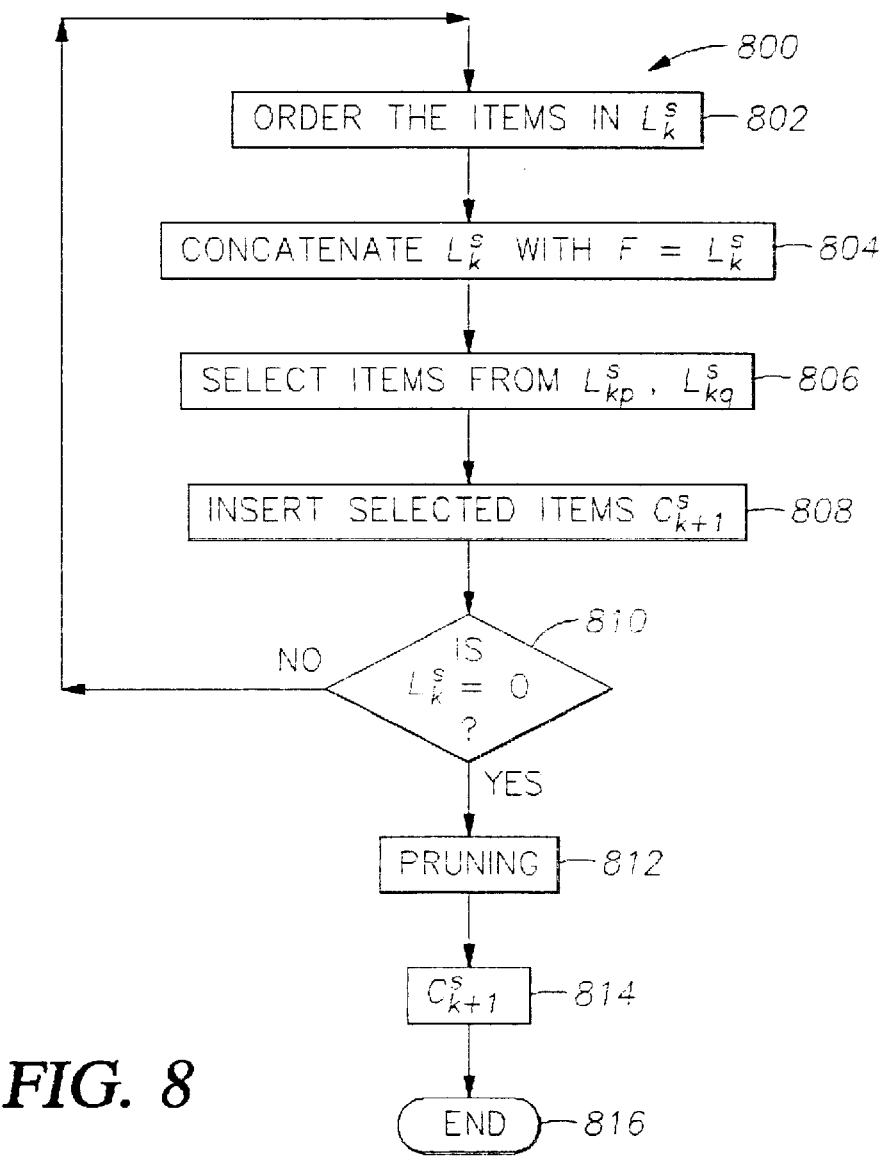
FIG. 7B is a table illustrating the results from an example application of the FIG. 7A multi-joins version of a candidate generation method in accordance with one embodiment of the present invention.
FIG. 8 is a flow chart showing a reorder method for generating a set of candidate itemsets in accordance with another embodiment of the present invention.

FIG. 7B illustrates the results of this method where the selected items in set S={2 4} and $L_2^s$ contains 5-itemset {1 2 3 4 5}. The selected items {2 4} are shown in bold numbers. In the prune step of step 722, potential candidates with a selected subset that is not present in $L_k^s$ are dropped from $C_{k+1}^s$. The method ends in step 724.

FIG. 8 shows a sequence of candidate generation method steps 800 to illustrate another example of one method aspect of the present invention. Generally, the embodiment of FIG. 8 employs an ordering of the items in a set $L_k^s$ which is concatenated with a frequent items set F during the candidate generation process. The ordering of the items in $L_k^s$ simplifies the concatenation of the two sets.

For ease of explanation, but without any limitation intended thereby, the example of FIG. 8 is also described in the context of the data mining apparatus 100 described above, as are each of the other candidate generation methods described in this application. The method is initiated in step 802 when the mining kernel 106 enters an iterative process where the items contained in $L_k^s$ arranged so that any items in $L_k^s$ which are also present in a set S precede any item which is not also in the set S. Only if two items are both in $L_k^s$ and also in the set S, or if two items in $L_k^s$ and both not in the set S, is a standard lexicographic ordering used. In the first iteration of the process, k=1. As discussed above with respect to FIG. 6, in step 804 $L_k^s$ is concatenated to the set of all large items F to create an initial $C_{k+1}^s$ having C itemsets. The itemsets, designated as $p.itemset_1, p.itemset_2, \ldots p.itemset_{k+1}$ of $L_{k+1}^s$ are joined to each of the large items F in step 806 to yield a set $C_{k+1}^s$ of candidate large itemsets in step 808, each c having k itemsets. The iterative process returns to step 802 and continues for subsequent passes over the data—assuming $L_k^s \neq 0$—as depicted in step 810. Depending upon the association rules desired and the constraints implemented, any item in $C_{k+1}^s$ that is deemed uninteresting as described above may be pruned from $C_{k+1}^s$ in step 812. The final candidate set $C_{k+1}^s$ is then generated as designated in step 814 and the method ends in step 816.

Figure 9:
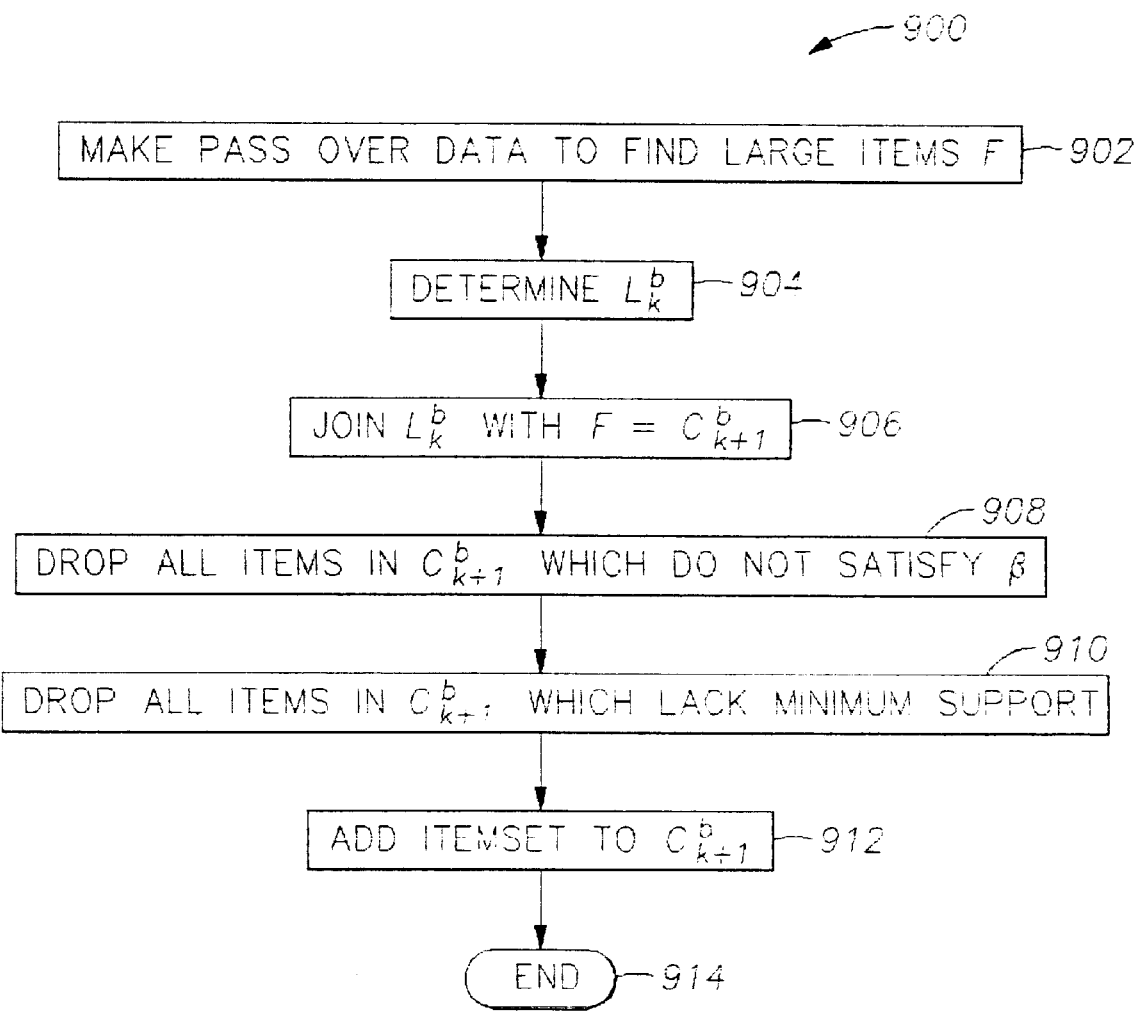
FIG. 9 is a flow chart showing a direct method for generating a set of candidate itemsets in accordance with another embodiment of the present invention.

In FIG. 9, another embodiment of a candidate generation method of the present invention is shown. To perform candidate generation method 900, rather than first generating a set of selected items S from β, finding all large itemsets that contain one or more items from S and then applying β to filter the large itemsets, β can be directly implemented in the candidate generation procedure. The intuition behind the candidate generation method 900 is that for any (k+1)-itemset X which satisfies β, there exists at least one k-subset that satisfies β, unless each $D_i$ which is true on X has exactly k+1 non-negated elements.

In step 902, a pass is made over the data by the mining kernel 106 to find the set of the large items F. The mining kernel 106 generates a set $L_k^b$ in step 904 which includes the set of all large k-itemsets that satisfy β. In step 906, $L_k^b$ is concatenated with F by the mining kernel 106 to generate $C_{k+1}^b$. In step 908, all candidates in $C_{k+1}^b$ that do not satisfy β are dropped, and all candidates in $C_{k+1}^b$ which lack minimum support are dropped in step 910. In step 912, for each disjunct $D_i = \alpha_{i1} \wedge \alpha_{i2} \wedge \ldots \wedge \alpha_{in_i}$ in β with exactly k+1 non-negated elements $\alpha_{ip1}, \alpha_{ip2}, \ldots, \alpha_{ipk+1}$, the itemset $\{\alpha_{ip1} \alpha_{ip2}, \ldots, \alpha_{ipk+1}\}$ is added to $C_{k+1}^b$ if all the $\alpha_{ipj}$ in S are large. The method ends in step 914 when the candidate set $C_{k+1}^b$ is final.

The implementation of candidate generation method 900 is easily understood with an example. Let the $\mathcal{L} = \{1\ 2\ 3\ 4\ 5\}$ and $\beta = (1 \wedge 2) \vee (4 \wedge \neg 5))$. Assume the mining kernel 106 has determined all items in $\mathcal{L}$ are large in step 902. Then $F_1 = \{1\ 2\ 3\ 4\ 5\}$, and $L_1^{b = \{\{4\}\}}$. To generate the potential candidate set $C_2^b$, $L_1^b$ is concatenated with all large items F in step 906, yielding $\{\{1\ 4\}\ \{2\ 4\}\ \{3\ 4\}\ \{4\ 5\}\}$. Because $\{4\ 5\}$ does not satisfy β, $\{4\ 5\}$ is dropped in step 908. The step in step 910 does not change $C_2^b$ because all 1-subsets that satisfy β are large. Finally, $\{1\ 2\}$ is added to $C_2^b$ in step 912 to get $C_2^b = \{\{1\ 2\}, \times 1\ 4\}, \{2\ 4\}, \{3\ 4\}\}$. The candidate generation method ends in step 914.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method using item constraints to discover association rules contained in a database, the method comprising:

finding large itemsets in a database that satisfy defined constraints, the defined constraints involving one or more items of a mining input expression;

determining subsets of large itemsets included in the itemsets, an itemset being large if its support is greater than a minimum support value, where support value for an itemset is based upon the number of times the itemset appears in the database; and finding association rules from the large itemsets that satisfy the defined constraints.

2. The method recited in claim 1, the method further comprising:

determining a support value for subsets of large itemsets included in the database where the subsets do not satisfy the defined constraints;

determining confidence values using large itemsets which satisfy the defined constraints and itemsets which do not satisfy the defined constraints, where a confidence value comprises a number of times an itemset appears in the database in relation to a number of times an associated itemset appears in the database; and outputting association rules that satisfy a minimum confidence value.

3. The method recited in claim 1, the method further comprising:

generating a set of selected items from the database such that any itemset that satisfies the defined constraints contains at least one selected item; and using only itemsets that contain at least one selected item to find association rules.

4. A method according to claim 1, wherein the defined constraints involve more than one item of a mining input expression comprising a boolean expression.

5. A method according to claim 1, wherein the defined constraints are represented by a mining input expression comprising a boolean expression having more than one item.

6. A method for discovering association rules using item constraints, the method comprising:

generating a set of selected items from a database based on predefined constraints, the predefined constraints involving one or more items of a mining input expression;

determining a support value for an itemset based upon the number of times the itemset appears in the database;

entering the itemset into a set of large itemsets if the support value of the itemset is greater than a minimum support value and the itemset contains at least one of the selected items; and outputting an association rule when the number of times the entered itemset appears in the database bears a predetermined relationship to a number of times an associated itemset appears in the database and thereby satisfies a minimum confidence constraint.

7. The method recited in claim 6, further comprising:

forming a second itemset by concatenating the large itemset with a set of large items in the database in accordance with a predetermined concatenation regime, where an item is large if the support value of the item is greater than a minimum support value;

joining any two elements of the second itemset that have at least one item in common;

generating a set of candidate itemsets including itemsets from the second itemset and joined elements; and using the set of candidate itemsets to output the association rules.

8. The method recited in claim 6, further comprising:

determining whether sets contained in the large itemsets satisfy the predefined constraints;

generating a set of candidate itemsets including large itemsets which satisfy the predefined constraints; and using the set of candidate itemsets to output the association rules.

9. The method recited in claim 8, the outputting association rules including pruning non-interesting association rules.

10. The method recited in claim 6, further comprising:

forming a second itemset by concatenating the large itemsets with a set of large items in accordance with a predetermined concatenation regime to generate a set of candidate itemsets, where an item is large if the support value of the item is greater than a minimum support value;

arranging the candidate itemsets so that each item within an itemset which is also contained in the set of selected items precedes any item not in the set of selected items; and using the set of candidate itemsets to output the association rules.

11. The method recited in claim 10, the outputting association rules including pruning non-interesting association rules.

12. The method recited in claim 6, the generating a selected set of items including pruning non-interesting items from the set.

13. A method for discovering association rules using item constraints, the method comprising:

determining a set of large items, where an item is large if the support value of the item is greater than a minimum support value;

generating a set of large itemsets where the large itemsets satisfy a predetermined constraint, the predetermined constraint involving one or more items of a mining input expression;

forming a second itemset by concatenating the large itemsets with the set of large items in accordance with a predetermined concatenation regime;

dropping any set of large items from the second itemset that does not satisfy the predetermined constraint;

dropping any set of large items in the second itemset that satisfies the predetermined constraint but does not have a support value greater than the minimum support value;

adding an itemset to the second itemset if all non-negated elements of the second itemset are large; and outputting an association rule when the number of times an itemset in the second itemset appears in the database bears a predetermined relationship to a number of times an associated itemset appears in the database and thereby satisfies a minimum confidence constraint.

14. A method for discovering association rules in a database using item constraints and items having a hierarchial taxonomy, the taxonomy defining descendant and ancestor relationships between the items, the method comprising:

generating a set of selected items from a database based on predefined constraints, the predefined constraints involving one or more of the items in a mining input expression;

determining a support value for an itemset;

if the support value of the itemset is greater than a minimum support value and the itemset contains at least one of the selected items, determining the number of times the itemset appears in the database;

entering the itemset into a set of large itemsets;

outputting an association rule when the number of times the entered itemset appears in the database bears a predetermined relationship to a number of times an associated itemset appears in the database and thereby satisfies a minimum confidence constraint.

15. The method recited in claim 14, further comprising:

forming a second itemset by concatenating the large itemsets with a set of large items in accordance with a predetermined concatenation regime, where an item is large if the support value of the item is greater than a minimum support value;

joining any two elements of the second itemset that have at least one item in common;

generating a set of candidate itemsets from the second itemset and the joined elements; and using the set of candidate itemsets to output the association rules.

16. The method recited in claim 14, of further comprising:

determining whether sets contained in the large itemsets satisfy the predefined constraints;

generating a set of candidate itemsets including large itemsets which satisfy the predefined constraints; and using the set of candidate itemsets to output the association rules.

17. The method recited in claim 16, the outputting association rules including pruning non-interesting association rules.

18. The method recited in claim 14, further comprising:

forming a second itemset by concatenating the large itemsets with a set of large items in accordance with a predetermined concatenation regime to generate a set of candidate itemsets, where an item is large if the support value of the item is greater than a minimum support value;

arranging the candidate itemsets so that each item within an itemset which is also contained in the set of selected items precedes any item not in the set of selected items; and using the set of candidate itemsets to output the association rules.

19. The method recited in claim 14, the outputting association rules including pruning non-interesting association rules.

20. The method according to any one of claims 6 or 14, wherein the predefined constraints are represented by a mining input expression comprising a boolean expression having more than one item.

21. A method for discovering association rules using item constraints, the method comprising:

determining a set of large items, where an item is large if the support value of the item is greater than a minimum support value;

generating a set of large itemsets where the large itemsets satisfy a predetermined constraint, the predetermined constraint involving one or more items of a mining input expression;

forming a second itemset by concatenating the large itemsets with the set of large items in accordance with a predetermined concatenation regime;

dropping any set of large items from the second itemset that does not satisfy the predetermined constraint;

dropping any set of large items in the second itemset that satisfies the predetermined constraint but does not have a support value greater than the minimum support value;

adding an itemset to the second itemset if all non-negated elements of the second itemset are large; and outputting an association rule when the number of times an itemset in the second itemset appears in the database bears a predetermined relationship to a number of times an associated itemset appears in the database and thereby satisfies a minimum confidence constraint.

22. A method according to any one of claims 13 or 21, wherein the predetermined constraint involves more than one item of a mining input expression comprising a boolean expression.

23. An article of manufacture tangibly embodying a program of machine-readable instructions executable by a digital processing apparatus to perform a method for discovering association rules using item constraints, the method comprising:

generating a set of selected items from a database based on predefined constraints, the predefined constraints involving one or more items of a mining input expression;

determining a support value for an itemset based upon the number of times the itemset appears in the database;

entering the itemset into a set of large itemsets if the support value of the itemset is greater than a minimum support value and the itemset contains at least one of the selected items; and outputting an association rule when the number of times the entered itemset appears in the database bears a predetermined relationship to a number of times an associated itemset appears in the database and thereby satisfies a minimum confidence constraint.

24. The article of manufacture recited in claim 23, the method further comprising:

forming a second itemset by concatenating the large itemset with a set of large items in the database in accordance with a predetermined concatenation regime, where an item is large if the support value of the item is greater than a minimum support value;

joining any two elements of the second itemset that have at least one item in common;

generating a set of candidate itemsets including itemsets from the second itemset and joined elements; and using the set of candidate itemsets to output the association rules.

25. The article of manufacture recited in claim 23, the method further comprising:

determining whether sets contained in the large itemsets satisfy the predetermined constraints;

generating a set of candidate itemsets including large itemsets which satisfy the predefined constraints; and using the set of candidate itemsets to output the association rules.

26. The article of manufacture recited in claim 25, the method further comprising outputting association rules including pruning of non-interesting association rules.

27. The article of manufacture recited in claim 23, the method further comprising:

forming a second itemset by concatenating the large itemsets with a set of large items in accordance with a predetermined concatenation regime to generate a set of candidate itemsets, where an item is large if the support value of the item is greater than a minimum support value;

arranging the candidate itemsets so that each item within an itemset which is also contained in the set of selected items precedes any item not in the set of selected items; and using the set of candidate itemsets to output the association rules.

28. The article of manufacture recited in claim 27, the method further comprising outputting association rules including pruning non-interesting association rules.

29. The article of manufacture recited in claim 23, the method further comprising the generating a selected set of items including pruning non-interesting items from the set.

30. An article of manufacture tangibly embodying a program of machine-readable instructions executable by a digital processing apparatus to perform a method for discovering rules using item constraints, the method comprising:

determining a set of large items, where an item is large if the support value of the item is greater than a minimum support value;

generating a set of large itemsets where the large itemsets satisfy a predetermined constraint, the predetermined constraint involving one or more items of a mining input expression;

forming a second itemset by concatenating the large itemsets with the set of large items in accordance with a predetermined concatenation regime;

dropping any set of large items from the second itemset that does not satisfy the predetermined constraint;

dropping any set of large items in the second itemset that satisfies the predetermined constraint but does not have a support value greater than the minimum support value;

adding an itemset to the second itemset if all non-negated elements of the second itemset are large; and outputting an association rule when the number of times an itemset in the second itemset appears in the database bears a predetermined relationship to a number of times an associated itemset appears in the database and thereby satisfies a minimum confidence constraint.

31. A digital processing machine used to discover trends in a database, the device comprising:

a database;

a digital processing apparatus, the digital processing apparatus configured to receive data and commands from a signal-bearing medium tangibly embodying a program of machine-readable instructions executable by the digital processing apparatus and used to perform a method for discovering trends in a database, said method comprising:

generating a set of selected items from a database based on predefined constraints, the predefined constraints involving one or more items of a mining input expression;

determining a support value for an itemset based upon the number of times the itemset appears in the database;

entering the itemset into a set of large itemsets if the support value of the itemset is greater than a minimum support value and the itemset contains at least one of the selected items; and outputting an association rule when the number of times the entered itemset appears in the database bears a predetermined relationship to a number of times an associated itemset appears in the database and thereby satisfies a minimum confidence constraint.

32. The machine recited in claim 31, where the method for discovering trends in a database further comprises:

forming a second itemset by concatenating the large itemset with a set of large items in the database in accordance with a predetermined concatenation regime, where an item is large if the support value of the item is greater than a minimum support value;

joining any two elements of the second itemset that have at least one item in common;

generating a set of candidate itemsets including itemsets from the second itemset and joined elements; and using the set of candidate itemsets to output the association rules.

33. The machine recited in claim 31, where the method for discovering trends in a database further comprises:

determining whether sets contained in the large itemsets satisfy the predefined constraints;

generating a set of candidate itemsets including large itemsets which satisfy the predefined constraints; and using the set of candidate itemsets to output the association rules.

34. The machine recited in claim 33, where the generating a selected set of items includes pruning non-interesting items from the set.

35. The machine recited in claim 31, where the method for discovering trends in a database further comprises:

forming a second itemset by concatenating the large itemsets with a set of large items in accordance with a predetermined concatenation regime to generate a set of candidate itemsets, where an item is large if the support value of the item is greater than a minimum support value;

arranging the candidate itemsets so that each item within an itemset which is also contained in the set of selected items precedes any item not in the set of selected items; and using the set of candidate itemsets to output the association rules.

36. The machine recited in claim 35, where the generating a selected set of items includes pruning non-interesting items from the set.

37. The machine recited in claim 31, where the generating a selected set of items includes pruning non-interesting items from the set.

38. A digital processing machine used to discover trends in a database, the device comprising:

determining a set of large items, where an item is large if the support value of the item is greater than a minimum support value;

generating a set of large itemsets where the large itemsets satisfy a predetermined constraint, the predetermined constraint represented by a boolean expression including items;

forming a second itemset by concatenating the large itemsets with the set of large items in accordance with a predetermined concatenation regime;

dropping any set of large items from the second itemset that does not satisfy the predetermined constraint;

dropping any set of large items in the second itemset that satisfies the predetermined constraint but does not have a support value greater than the minimum support value;

adding an itemset to the second itemset if all non-negated elements of the second itemset are large; and outputting an association rule when the number of times an itemset in the second itemset appears in the database bears a predetermined relationship to a number of times an associated itemset appears in the database and thereby satisfies a minimum confidence constraint.

* * * * *

UNITED STATES PATENT AND TRADEMARK OFFICE
CERTIFICATE OF CORRECTION

PATENT NO. : 6,061,682
DATED : May 9, 2000
INVENTOR(S) : R. Agrawal et al.

Page 1 of 3

It is certified that error appears in the above-identified patent and that said Letters Patent is hereby corrected as shown below:

The following prior art should be added to the face of the patent:

| | | | |
|---|---|---|---|
| 4,495,566 | 01/1985 | Dickinson et al | 364/200 |
| 4,862,408 | 08/1989 | Zamora | 364/900 |
| 4,942,526 | 07/1990 | Okajima et al | 364/419 |
| 4,972,349 | 11/1990 | Kleinberger | 364/900 |
| 5,056,021 | 10/1991 | Ausborn | 364/419 |
| 5,146,406 | 09/1992 | Jensen | 364/419 |
| 5,418,716 | 05/1995 | Suematsu | 364/419 |
| 5,418,948 | 05/1995 | Turtle | 395/600 |
| 5,331,554 | 07/1994 | Graham | 364/419 |
| 5,542,090 | 07/1996 | Henderson et al | 395/600 |
| 5,615,341 | 03/1997 | Agrawal et al | 395/210 |

Agrawal, R. et al., Database Mining: A Performance Perspective, IEEE Transactions of Knowledge and Data Engineering, 5(6):914-925, December 1993.

Deerwester, S. et al., Indexing by Latent Semantic Analysis, Journal of the American Society for Information Science 41(6):391-407, 1990

Gay, L. et al., Interpreting Nominal Compounds for Information Retrieval, Information Processing & Management 26(1) 21-38, 1990

Renouf, A. Making sense of text: automated approaches to meaning extraction, Online Information 93 pp. 77-87, December 7-9, 1993

Salton, G. et al., Automatic Analysis, Theme Generation, and Summarization of Machine-Readable texts, SCIENCE 264:1421-1426, June 3, 1994

Feldman, R. et al., Mining Associations in Text in the Presence of Background Knowledge, Technology Spotlight/Spatial, Temporal & Multimedia Data Mining, pp. 343-346 (undated)

Mannila, H. et al., Improved Methods for Finding Association Rules, Pub. No. C-1993-656, 20 pages, Univ. of Helsinki, 1993

Savasere, A. et al., An Efficient Algorithm for Mining Association Rules in Large Databases, proceedings of the 21st VLDB Conference, Zurich, Switzerland, pp. 432-444, 1995

UNITED STATES PATENT AND TRADEMARK OFFICE
CERTIFICATE OF CORRECTION

PATENT NO. : 6,061,682
DATED : May 9, 2000
INVENTOR(S) : R. Agrawal et al.

It is certified that error appears in the above-identified patent and that said Letters Patent is hereby corrected as shown below:

Han, J. et al., Discovery of Multiple-Level Association Rules from Large Databases, Proceedings of the 21st VLDB Conference, Zurich, Switzerland, pp. 420-431, 1995

Srikant, R. et al., Mining Association Rules, IBM Research Division, Almaden Research Center, California, 46 pages (undated abstract)

Croft, W. et al., The Use of Phrases and Structured Queries in Information Retrieval, University of Massachsetts, Computer and Information Science Dept., Association for Computing Machinery (ACM)-0-89791-448, pp. 32-45, January 1991

Park, J. et al., An Effective Hash Based Algorithm for Mining Association Rules, IBM Thomas J. Watson Research Center, New York, Association of Computing Machinery (ACM) 0-89791-731, pp. 175-186, June 1995

Houtsma, M. et al., Set-Oriented Mining for Association Rules, Computer Science, October 23, 1993, IBM Research Division, Almaden Research Center, California, 19 pages Feldman, R. et al., Knowledge Discovery in Textural Databases (KDT), Bar-Ilan University, Israel, Math and Computer Science Dept., KDD-95, pp. 112-117

Srikant, R. et al., Mining Generalized Association Rules, Proceedings of the 21st VLDB Conference, Zurich, Switzerland, pp. 407-419, 1995

Srikant, R. et al., Mining Quantitative Association Rules in Large Relational Tables, IBM Almaden Research Center, California, 22 pages, (undated abstract)

UNITED STATES PATENT AND TRADEMARK OFFICE
CERTIFICATE OF CORRECTION

PATENT NO. : 6,061,682
DATED : May 9, 2000
INVENTOR(S) : R. Agrawal et al.

It is certified that error appears in the above-identified patent and that said Letters Patent is hereby corrected as shown below:

Agrawal, R. et al., Active Data Mining, IBM Almaden Research Center, California, KDD-95, pp. 3-8

Agrawal. R. et al., Querying Shapes of Histories, Proceedings of the 21st VLDB conference, Zurich, Switzerland, pp. 502-510, 1995

Agrawal, R. et al., Mining Association Rules Between Sets of Items in Large Databases, IBM Almaden Research Center, California, Association for Computing Machinery (ACM) 0-89791-592, May 1993

Signed and Sealed this

Twenty-seventh of November, 2001

Attest:

*Attesting Officer*

NICHOLAS P. GODICI
*Acting Director of the United States Patent and Trademark Office*